United States Patent [19]
Stiltner

[11] 3,776,276
[45] Dec. 4, 1973

[54] VALVE SEAL
[76] Inventor: Marshall A. Stiltner, 632 Cliff Dr., Laguna Beach, Calif. 92651
[22] Filed: Mar. 15, 1971
[21] Appl. No.: 124,343

Related U.S. Application Data
[63] Continuation-in-part of Ser. No. 867,691, Oct. 20, 1969, abandoned.

[52] U.S. Cl. ........ 137/625.18, 137/625.48, 251/172, 251/175, 251/174, 251/193, 251/328
[51] Int. Cl. .............................................. F16k 3/02
[58] Field of Search .................... 251/170, 171, 172, 251/174, 175, 176, 282, 328; 137/625.18, 625.48

[56] References Cited
UNITED STATES PATENTS

| | | | |
|---|---|---|---|
| 2,030,458 | 2/1936 | McKellar | 251/174 X |
| 2,796,230 | 6/1957 | Grove | 251/172 |
| 2,822,823 | 2/1958 | Klein | 251/174 X |
| 2,858,851 | 11/1958 | Holl | 137/625.18 |
| 2,985,421 | 5/1961 | Anderson | 251/172 |
| 3,329,168 | 7/1967 | Vollmer | 251/175 X |
| 3,368,793 | 2/1968 | Gundelfinger | 251/174 |
| 3,432,141 | 3/1969 | Irti | 251/172 |
| 3,494,377 | 2/1970 | Thuse | 137/625.18 |

Primary Examiner—Harold W. Weakley
Attorney—Newton H. Lee, Jr.

[57] ABSTRACT

A valve assembly in which a tubular seal ring circumscribes a valve port and has a flat end face slidably and sealingly engaged with the opposing flat face of a valve member having another port, the seal ring having a resilient seal engaged in a bore between a shoulder in the seal ring and an opposing stationary shoulder and the seal ring also having a skirt extending into the valve port and engaged by a spring to bias the flat face of the seal ring into normal engagement with the opposing flat face.

10 Claims, 6 Drawing Figures

INVENTOR.
MARSHALL A. STILTNER
BY
Newton H. Lee, Jr.

VALVE SEAL

CROSS-REFERENCE TO RELATED APPLICATION

This application is a continuation-in-part of my pending application Ser. No. 867,691, filed Oct. 20, 1969, for Valve Seal, and now abandoned.

BACKGROUND OF THE INVENTION

A well-known type of valve assembly is one in which a ported valve body has a ported valve member shiftable in the valve body to effect registry or non-registry of the ports, wherein a tubular metallic seal ring circumscribes a port and has a flat sealing end face which is sealingly engaged with an opposing flat face of one of the valve members to prevent leakage between the members.

Typically, these tubular metallic seals are disposed in a bore in one of the valve members, an O-ring seal being carried by the outer wall of the tubular seal to prevent leakage past the outside of the tubular seal. In order to effect initial engagement of the flat end face of the tubular metallic seal with the opposing flat face of the relatively movable valve member it is the practice to employ a spring acting on the tubular metallic seal to bias it outwardly in the bore.

Particularly, when such valves are employed in high pressure service, the inrush of fluid into the sealing end of the tubular seal when the valve is being opened imposes a high order force on the tubular seal tending to force it inwardly in the bore against the pressure of the spring. As a result of such a force, the tubular seals are moved inwardly to such an extent that unless the spring is quite strong the spring may be caused to take a set, and the flat end face of the tubular seal will not effectively engage the opposing flat face of the valve member. To avoid such a problem, strong springs have been employed which constantly apply a correspondingly strong force to cause engagement of the flat end face of the tubular seal with the opposing flat face of the valve member. This condition prevails when the valve is closed, thereby requiring that a large actuating force be applied to the shiftable valve member to overcome the resultant friction. In addition, the large force imposed by the springs causes rapid wear of the flat end face, as well as galling if the medium flowing through the valve assembly does not lubricate the contacting flat faces.

Obviously, the more complex the porting of the valve assembly, and the greater the number of necessary tubular seal members, the more aggravated is the problem of supplying sufficient actuating force for the shiftable valve member, and the more frequent the need for valve repair or replacement of the components.

SUMMARY OF THE INVENTION

The present invention provides a valve assembly of the type referred to above with novel tubular sealing elements, whereby the shiftable member is easy to actuate and wear of the tubular seals is substantially reduced.

More particularly, the present invention provides a valve assembly of the type employing tubular seals which circumscribe a port and have a flat end face slidably and sealingly engaged with the opposing flat face of a relatively shiftable valve member, wherein only a light spring force, sufficient to maintain contact between the flat faces is necessary, and therefore, only a light actuating force is required to shift the shiftable valve member, thereby substantially simplifying and reducing the cost of valve installation when automatic actuation is desired, and rendering operation of the valve easily within manual capability, without providing actuators having high mechanical advantage.

In addition, the tubular seals are so constructed that they cannot be set or permanently forced back in their bore due to the inrush of high pressure fluid.

In accomplishing the foregoing, the invention provides a tubular seal construction which relies for seating pressure on the relationship of the fluid pressure responsive areas of the tubular seal, so that the valve assembly may be adapted to use in various high or low pressure applications.

The present invention also contemplates a tubular seal which the pressure responsive areas of the tubular seal may be varied to condition the valve for use under various pressure and flow conditions. In addition, the tubular seal is constructed, in accordance with one embodiment, so that flow between passages is eliminated during transition between closed and open flow conditions.

This invention possesses many other advantages, and has other purposes which may be made more clearly apparent from a consideration of a form in which it may be embodied. This form is shown in the drawings accompanying and forming a part of the present specification. It will now be described in detail, for the purpose of illustrating the general principles of the invention; but it is to be understood that such detailed description is not to be taken in a limiting sense, since the scope of the invention is best defined by the appended claims. cBRIEF DESCRIPTION OF THE DRAWINGS FIG. 1 is a side elevation of an illustrative valve assembly;

DESCRIPTION OF THE PREFERRED EMBODIMENTS

Figure 1:
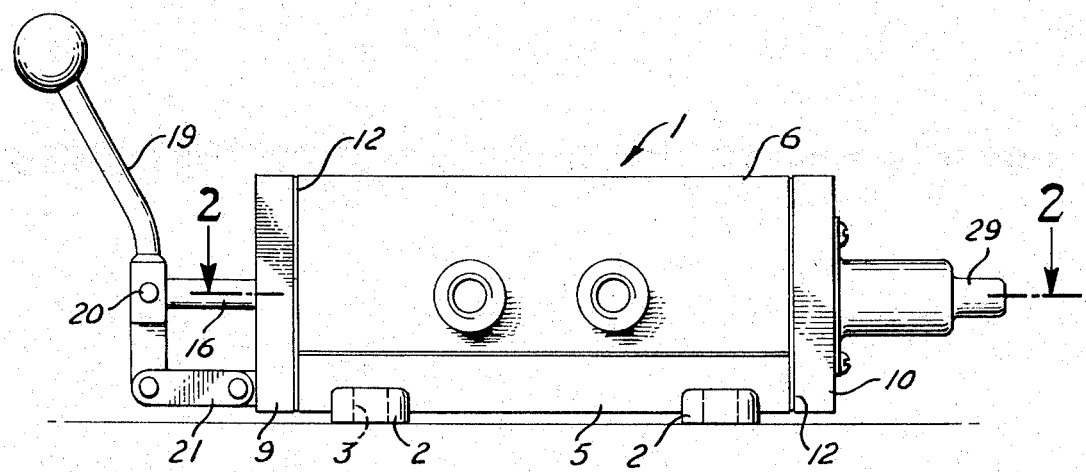

As seen in the drawings, the invention is embodied, for illustrative purposes only, in a valve assembly comprising an elongated body 1 of any desired configuration adapted to enable application of the valve assembly to various mountings (not shown), for which purpose the body 1 may be provided with suitable mounting ears 2 in appropriate locations, the ears having openings 3 for accomodating fasteners.

Figure 3:
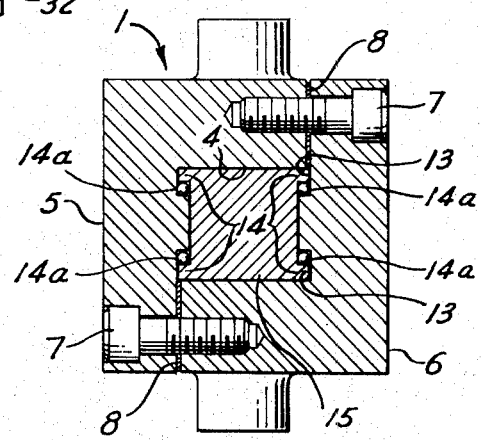
FIG. 3 is a transverse section, as taken on the line 3—3 of FIG. 2.

Within the body 1 is formed a rectangular, longitudinally extended chamber 4. Thus, the body 1 may be composed of complemental body parts 5 and 6, as seen in FIG. 3, joined together by appropriate cap screws 7, sealing gaskets 8 being provided at the interface. At its ends, the body 1 has end caps 9 and 10 which are secured to the body by cap screws 11, sealing gaskets 12 being interposed between the end caps and the confronting faces of the body.

As seen in FIG. 3, the chamber 4 is substantially square and has parallel grooves 13 extending longitudinally of the body at the corners of the chamber to receive complemental ribs 14 at the corners of the valve slide 15. The slide 15 thus is slidably mounted on the ribs 14 in the grooves 13 for longitudinal movement under the influence of suitable actuator means. Bearings, such as balls 14a are employed between the supporting surfaces of the ribs 14 and the grooves 13.

Illustratively, the actuating means for the slide 15 includes an end rod 16 which is connected at 17 to the slide 15 and which extends through a sealed opening 18 in the end cap 9. A lever 19 is connected at 20 to the outer end of the rod 16 and is connected by a link 21 to the body 1, whereby pivotal movement of the lever 19 will effect longitudinal movement of the slide 15. At the other end of the slide 15 is a rod 22 which is connected to the slide at 23 and extends through a sealed opening 24 in the end cap 10. The rod 22 has a shoulder 25 which engages a spring seat 26 for a coiled spring 27, one end of the spring engaging the seat 26, and the other end of the spring engaging a fixed stop or seat 28 in a cap 29 which is suitably affixed to the end cap 10. Thus, the spring 27 acts to bias the slide 15 to the left, as viewed in FIG. 2.

Figure 2:
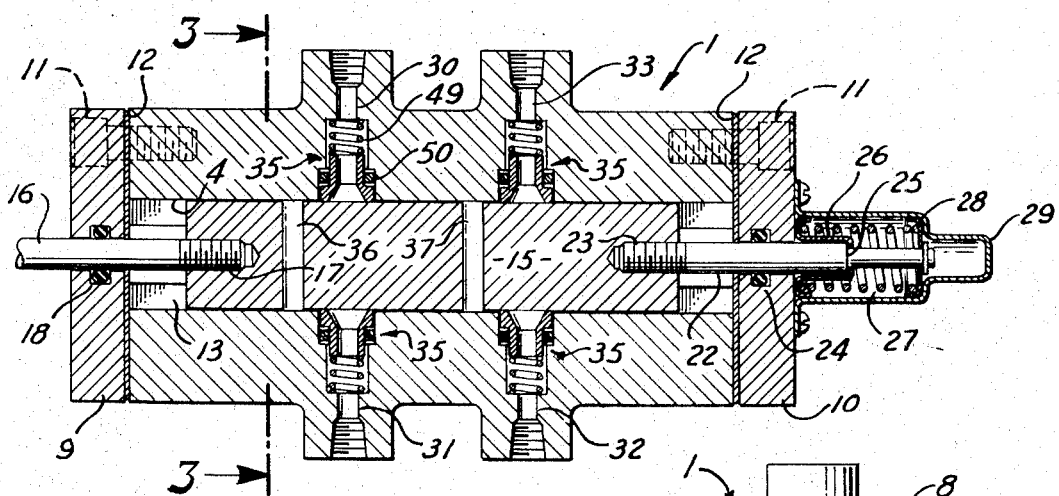
FIG. 2 is a longitudinal section through the assembly as taken on the line 2—2 of FIG. 1.

The valve body 1 and the slide 15 may have any desired porting arrangement to satisfy the requirements of a specific application. In the illustrated valve, the body 1 has a number of ports 30, 31, 32, and 33, each having tubular seal means 35. These seal means 35, as will hereinafter be more fully described, are adapted to sealingly engage a flat face of the slide 15 to prevent the flow of fluid longitudinally of the chamber 4, along the slide 15, when the valve is closed, and to confine the flow of fluid to the path between the ports 30, 31, 32 and 33 determined by the porting in the slide 15, when the valve is open. In the illustrated valve, the slide 15 has a pair of ports 36 and 37 which are closed off from the flow of fluid by the seals 35 when the slide is in one position, under the influence of the spring 27, but the ports 36 and 37, respectively, establish communication between the body ports 30, 31 and the body ports 32, 33, when the slide 15 is moved to the right, as seen in FIG. 2, under the influence of the actuator lever 19.

The valve assembly described above forms no part of the present invention, except as an exemplary application of the novel seals 35, to a valve assembly including relatively shiftable ported members adapted to control the flow of fluid through the ports responsive to relative movement of one of the members between a first, valve closed position, and a second, valve open position. While a slide valve is herein illustrated, it will also be understood that the valve assembly may comprise a ported body having a ported rotary disc which constitute the relatively shiftable members. In addition, while the seals 35 are shown as being in the stationary member, such seals may, if desired, be in the shiftable member.

Figure 4:
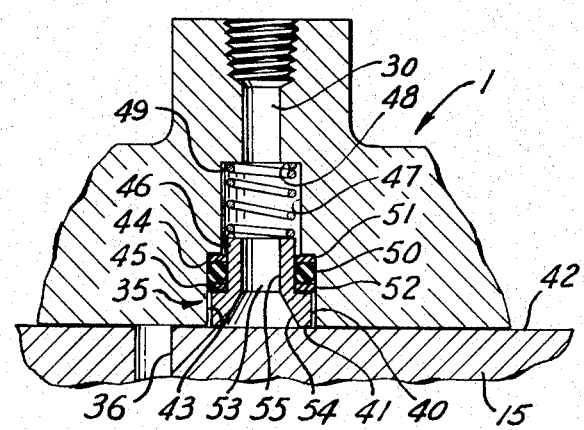
FIG. 4 is an enlarged detailed view showing a typical tubular seal means.
Figure 5:
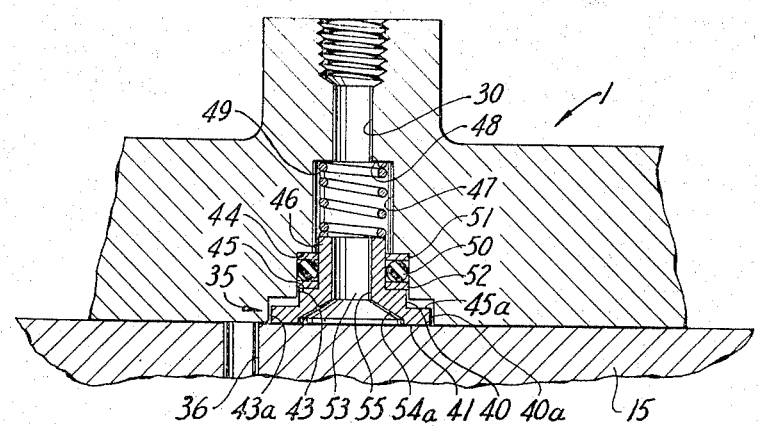
FIG. 5 is a view corresponding to FIG. 4, but showing a modified seal construction.
Figure 6:
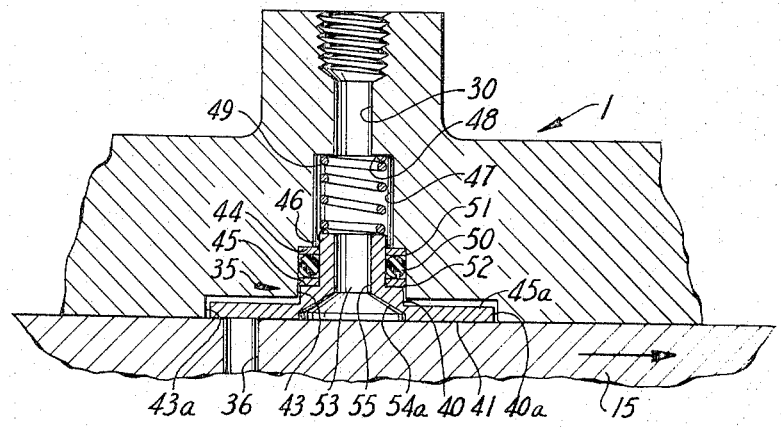
FIG. 6 is a view also corresponding to FIG. 4, and showing still another modified seal construction.

The essence of the present invention resides in the provision of such a valve assembly with novel seals 35, the details of which may be best seen with reference to FIGS. 4–6, wherein the seal in port 30 is shown as typical of all of the seals 35.

More particularly, the seal means 35, as seen in FIG. 4, comprises a tubular member having a main, annular body portion 40 is provided with a flat end face 41 adapted for sliding and sealing engagement with the opposing flat face 42 of the slide 15. The body 40 is disposed in a bore 43 in the body member 1. The bore 43 terminates in an annular shoulder 44 which is opposed to a shoulder 45 on the body 40. Extending axially of the bore 43 from the body 40 is a skirt 46 which projects into the port 30, or specifically into a reduced bore 47 which provides a shoulder 48 spaced from the end of the skirt 46. A coiled compression spring 49 is interposed between the shoulder 48 and the end of the skirt 46 to provide at least a light pressure engagement of the flat seal face 41 with the flat face 42 of the slide 15.

The opposing shoulders 44 and 45 in the bore 43 and on the body 40, together with the wall of the bore 43 and the outer periphery of the skirt 46, combine to form an annular space in which seal means, including a resilient O-ring 50, are disposed. The O-ring 50 sealingly engages the wall of bore 43 and the skirt 46, and annular back-up rings 51 and 52 are spectively disposed between the O-ring 50 and the shoulders 44 and 45 to prevent undesired extrusion of the O-ring.

Extending axially through the seal body 35 and the skirt tapered 46 is a passage 53 formed by an inwardly convergent or taped surface 54 which extends from a juncture with the flat seal face 41 inwardly to a juncture with a cylindrical wall 55 in the skirt 46.

From the foregoing, it is apparent that under static pressure conditions, when the valve is closed, and assuming the port 30 to be an inlet port, the forces acting on the seal 35 to maintain sealing contact between the flat seal end face 41 and the flat face 42 of the slide 15 are the combined forces derived from the spring 49, plus the force derived from fluid pressure acting on the annular end area of the skirt 46 and the annular area of the shoulder 45 on the seal head 40.

Likewise, it is apparent that the forces acting in the opposite directions are the forces derived from the effect of system pressure on the annular cross-sectional area of the convergent wall 54 of the seal body 40, plus the effective net pressure of a gradient extending across the annular, flat, end area 41 of the seal body 40. Thus, there is an unbalanced force tending to prevent leakage between the flat seal face 41 and the slide face 42 which enables the utilization of a light spring 49 to assure initial engagement of the flat faces 41 and 42 under no-pressure conditions. Since the spring 49 may be lightly rated so as to apply only a small force on the seal rings, the force required to shift the slide 15, or other shiftable valve member is minimized, enabling utilization of simple actuators of low force capacity in automatic systems. In addition, high shifting speed will not cause galling in the case where the fluid is non-lubricating.

The balance of the seal 35, being a function of the relative areas of the end face 41 and the shoulder 45, is capable of variation to satisfy use of the valve assembly in different environments and pressures.

Moreover, due to the unique structure of the seals 35, the force of the spring 49 need not be great to prevent inward movement of the seal body 40 under reverse flow condition, i.e., when fluid flows into the seal 35 from the port 36 of FIG. 4.

Under these latter conditions, the tendency of the seal body 40 to be forced inwardly with respect to the bore 43, due to inrush of fluid when the valve is opened, is initially resisted by the O-ring seal means 50 which substantially fills the annular space defined between the shoulders 44 and 45, the wall of bore 43 and the outer periphery of the skirt 46. In a matter of a small fraction of a second after opening of the valve, system pressure is effective on the seal ring to provide the over-balance tending to maintain the seal faces 41 and 42 in sealing engagement. Accordingly, the seal 35 avoids the setting problem experienced by the prior art seals.

Referring to FIG. 5, a modified construction of the valve seal 35 and the body 1 is shown. Here, the tubular sealing element is modified by extending the body section 40 radially outwardly, as at 40a, a selected distance and the valve body 1 is modified by the provision of an enlarged bore or cavity 43a extending outwardly from the bore 43 a sufficient distance to accommodate the outwardly extended portion 40a of the seal body 40. This enables the bevelled face 54a which circumscribes the passage 53 to be of a greater area for a seal of a given passage size. In addition, the outwardly extended flange portion 40a also provides a surface 45a which extends outwardly from the shoulder 45, so as to be exposed to pressure of fluid in the enlarged bore 43a, further tending to overcome the pressure acting on the seal 35, upon reverse inrush of fluid through body port 30, tending to force the seal 35 inwardly in the bore. The area of surface 45a, the bevelled surface 54a and the flat end face 41 can thus be calculated or tailored to suit various flow and pressure conditions, and the necessary face-to-face sealing relationship may be maintained, without excessive loading by the spring 49.

Referring to FIG. 6, a further modification is shown. In some applications of the valves of the present invention, non-interflow between ports is desired. This is to say that the flow from the inlet into the body and from the outlets during transitional movement of the slide 15 is not desired, but the usual seal elements, including the seals 35 hereof, previously described, progressively establish communication, and a certain amount of interflow is allowed during transitional movement of the slide between open and closed positions, as the annular end face 41 traverses the open port 30, as seen in FIGS. 4 and 5.

The structure of the valve element 35, according to FIG. 6, is such that interflow is prevented. More particularly, the non-interflow characteristic is accomplished by extending the flange 40a outwardly and enlarging the bore 43a to provide a flange and a flange receiving cavity having a dimension outwardly from the bevelled wall 54a greater than the size of the port 30, at least, in the direction of movement of the seal 35. In other words, it will be understood that the non-interflow structure of FIG. 6 need not involve, necessarily, that the flange 40a be larger than the port 30 throughout the entire extent of the flange about the opening 53, but only on the portion of the flange 40a which progressively moves past the port seal, when the slide 15 is moved, say to the right, as shown by the arrow in FIG. 6.

I claim:

1. In a valve assembly, including a stationary member having a port, a shiftable member having a port, means for shifting the latter member between a position at which said ports are in registry and a position at which said ports are out of registry, one of said members having a flat face through which its port opens, the other of said members carrying a tubular metallic one-piece seal ring circumscribing said port in the latter member and having an annular flat end face slidably and sealingly engaged with said flat face of said one of said members, said seal carrying member having a bore in which said seal ring is disposed, said bore providing an annular shoulder, said metallic seal ring having an external annular shoulder opposed to said shoulder in said bore, a skirt extending axially of said metallic seal ring from said external shoulder into said bore in said seal carrying member, said skirt having an inside diameter less than said bore and terminating in axially spaced relation to the bottom of said bore, and resilient seal means interposed between and engaged with said shoulders and extending about said skirt said seal means being engaged with said skirt and the wall of said bore to provide seal means in said bore between the exterior of said metallic seal ring and the seal carrying member, said seal means also resiliently resisting inward movement of said metallic ring in said bore.

2. In a valve assembly as defined in claim 1, a compression spring interposed between the bottom of said bore and the inner end of said skirt.

3. In a valve assembly as defined in claim 1, said resilient seal means comprising an O-ring and a pair of back-up rings respectively engaged with one of said shoulders and with said O-ring.

4. In a valve assembly as defined in claim 1, said resilient seal means comprising an O-ring and a pair of back-up rings respectively engaged with one of said shoulders and with said O-ring, and a compression spring interposed between the bottom of said bore and the inner end of said skirt.

5. In a valve assembly as defined in claim 1, the port through said seal ring being smaller than the inner periphery of said end face of said seal ring, an inwardly tapered face extending from said inner periphery of said end face to said port, and the annular area of said shoulder on said body being greater than the annular area of said end face.

6. A valve assembly as defined in claim 1, wherein said seal ring has a bevelled surface leading from said end face to the inside diameter of said seal ring.

7. A valve assembly as defined in claim 1, wherein an enlarged bore is provided in said body extending outwardly from said first mentioned bore, said seal ring and the flat end face thereon extending beyond said seal means into said enlarged bore.

8. A valve assembly as defined in claim 1, wherein an enlarged bore is provided in said body extending outwardly from said first mentioned bore, said seal ring and the flat end face thereon extending beyond said seal means into said enlarged bore, said seal ring having a bevelled surface leading from said flat end face to the inside diameter of said seal ring.

9. A valve assembly as defined in claim 1, wherein an enlarged bore is provided in said body extending outwardly from said first mentioned bore, said seal ring and the flat end face thereon extending beyond said seal means into said enlarged bore, and having a dimension in the direction of movement of said shiftable member greater than said port in said stationary member, whereby said flat end face on said seal closes said port during transitional movement of said shiftable member between said positions.

10. In a valve assembly, including a stationary member having a plurality of ports, a shiftable member having a plurality of ports, means for shifting the latter member between a position at which said ports of the respective members are in registry and a position at which said ports of the respective members are out of registry, one of said members having a flat face through which its ports open, the other of said members carrying a tubular one-piece seal in the ports thereon and circumscribing the respective ports in said latter member and having a flat end face slidably and sealingly engaged with said flat face of said one of said members, said seal carrying member having a cavity in which said seal ring is disposed, resilient sealing means in said cavity forming a seal between said seal and said seal carrying member, said seal and end flange providing said flat end face, and having a dimension in the direction of movement of said shiftable member greater than said port in said stationary member, whereby said flat end face on said seal closes said port during transitional movement of said shiftable member between said positions.

* * * * *